(12) United States Patent
Suta

(10) Patent No.: US 7,241,320 B1
(45) Date of Patent: Jul. 10, 2007

(54) COMPOSITION AND PROCESS FOR IMPROVING THE COMBUSTIBLES COMBUSTION, PROCESS AND DEVICE FOR OBTAINING SUCH COMPOSITION

(76) Inventor: Mihai Suta, Bd. Ferdinand I 97-17, Bucharest 3 (RO)

( * ) Notice: Subject to any disclaimer, the term of this patent is extended or adjusted under 35 U.S.C. 154(b) by 401 days.

(21) Appl. No.: 10/257,812

(22) PCT Filed: Sep. 15, 2000

(86) PCT No.: PCT/RO00/00017

§ 371 (c)(1),
(2), (4) Date: Oct. 15, 2002

(87) PCT Pub. No.: WO01/77258

PCT Pub. Date: Oct. 18, 2001

(30) Foreign Application Priority Data

Apr. 12, 2000 (RO) .................................. 00-00405

(51) Int. Cl.
*C10L 1/12* (2006.01)
*F23B 90/00* (2006.01)

(52) U.S. Cl. ............................ 44/301; 44/457; 44/603; 44/904; 431/2

(58) Field of Classification Search ................ 44/301, 44/457, 603, 904; 431/2
See application file for complete search history.

(56) References Cited

U.S. PATENT DOCUMENTS 6,258,336 B1 * 7/2001 Breen et al. ............. 423/239.1

FOREIGN PATENT DOCUMENTS

| CN | 1124279 | * | 6/1996 |
| CN | 1155000 | * | 7/1997 |
| CN | 1155574 | * | 7/1997 |
| CN | 1234428 | * | 11/1999 |
| RO | 113489 | * | 7/1998 |

* cited by examiner

*Primary Examiner*—Cephia D. Toomer
(74) *Attorney, Agent, or Firm*—Jonathan Myers; Andrew Wilford

(57) ABSTRACT

The invention relates to a composition and process for improving the combustion of any kind of combustible. Also the invention relates to a process and device for obtaining such composition. The variant destined to the firing installations using common liquid/gaseous combustible as well as those ones using solid combustibles and, simultaneously liquid/gaseous combustibles for enhancing the combustion contain −20% of 6% watery solution of potassium dichromate, treated with monochromatic light having/=480–490. 10-9 m; 0.02 ammonia; 0.3% non-additivated mineral oil and −80% demineralized water. The variant destined to the firing installations using solid combustibles −10% of 5% watery solution of potassium permanganate, treated with monochromatic light having/=595–625. 10-9 m; 0.05% urea 0.3% non-additivated mineral oil and −90% de-mineralized water. The process for improving the combustibles combustion by using these composition consists in their introduction into either the combustion air or the mass of the combustibles. The process of treating the active substance of these compositions with monochromatic light consists in that the active substance draining with constant discharge along a collector trough (1") is allowed to freely drop along the superior generating line of quartz glass cylinder (2"), in uniform rotation with 10-12 rot/min, axially illuminated by a monochromatic light generator of 20 w power and 40 m VV/cm2 light density. A monochromatic light generator (4") with a colour filter (7") is placed at one end of the cylinder (2") so the light is emitted along the cylinder rotation axis, and at the other end a plane mirror (5") is placed so the light of generator (4") is reflected; a collecting vessel (6") is disposed under the glass cylinder (2") in order to collect the treated liquid flowing along the cylinder (2").

5 Claims, 2 Drawing Sheets

COMPOSITION AND PROCESS FOR IMPROVING THE COMBUSTIBLES COMBUSTION, PROCESS AND DEVICE FOR OBTAINING SUCH COMPOSITION

CROSS REFERENCE TO RELATED APPLICATIONS

This application is a national stage of PCT/RO 00/00017 filed 15 Sep. 2000 and is based upon Romanian national application A 2000 00405 filed 12 Apr. 2000 under the International Convention.

FIELD OF THE INVENTION

The invention relates to a composition and process for improving the combustion of any kind of combustible, liquid, solid or gaseous, in industrial or home applications. Also the invention relates to a process and device for obtaining such composition. Although the invention may be used for treating any type of combustible, the most remarkable results may be obtained in treating lower heat value combustibles requiring complicated and expensive firing technologies, and generating significant corrosion and the pollution of the environment.

BACKGROUND OF THE INVENTION

There are many compositions and processes used for enhancing the combustion of combustibles and/or preventing deposits and corrosion phenomena destined to be principally used in industrial firing installations and less in the home ones, because of their complexity and the relatively high cost.

One of the most used and applied processes for increasing the total energy produced by the combustion of liquid, gaseous and mostly fossil fuels, using burners, consists in the modification of the physical—chemical conditions of the combustion reaction. For this purpose, an activator liquid, more precisely a combination of chemical compounds with a surface inhibitor peroxidant, is introduced as an aerosol in the combustion air. In order to control the homolytic breaking of the chemical bonds of the combustible molecules, a steady contribution of free radicals—especially new oxygen free radicals—is acquired on purpose to eliminate the free-radical termination phase and assure a larger number of molecules participating in this reaction. Similarly, a composition capable of modifying the physical parameters of the combustible is also introduced into the combustion air, which allows all the molecular participants in this reaction to be effective. Simultaneously, the surface properties of a chemical combination introduced in the combustion air are also controlled through some surface agents. Lastly, for the reduction of boiler corrosion, corrosion inhibitors are also introduced into the combustion air.

The apparatus for carrying out the process includes an active carbon filter for air, vessels into which the said compositions are introduced, air dosage pumps of the piston, membrane or other type, as well as some slide-valves or intermediate regulates the flow adjustment. The air generated by the dosage pumps is bubbled into the compositions generating the aerosols, and the additive air flow so formed is regulated by using the intermediate slide-valves and mixed with the rest of the combustion air sent to the burners. In case the additivation air system is damaged, a safety device stops the combustible access to the burners.

Over time, both the process and the apparatus have undergone changes and improvements, but their functioning general principles are still the same.

Hence the known compositions include at least one compound capable of releasing active oxygen, the choice being preferably made between hydrogen peroxide and alkali or alkali-earth metals peroxides.

According to the known process, the peroxide used is previously introduced in a limited fraction of combustion air, reunited with a principal fraction of combustion air, and the both fractions are introduced in the combustion chamber, preferably at a burner nozzle level. To introduce the peroxide into the combustion air, the limited air fraction is passed through a liquid containing the peroxide. The other compositions are subjected to the same process. The improvements are related, in principal, to achieving the best compositions, and the precise parameters in which the process have to be developed, as well as improving the apparatus for obtaining a stabile and optimum flow. Another problem to be solved is achieving a simple, one alkaline metal based composition, a process and an installation which allow both the improvement of the used combustible combustion and the prevention of the appearance of deposits and corrosion phenomena and, in case the said deposits already exist, their elimination. Another purpose was its applicability both to industrial and home firing installations.

The Romanian patent To 113489, of the present applicant, successfully resolves this technical problem by starting from the use of the sulfuric acid permanently produced during the combustible combustion for the oxidation of the combustible stable particles (the unburned substances), by using a alkaline metal or salt-based composition for additivating the combustion air in industrial and home firing installations. The said composition consists, in a first preferred embodiment, in about 95% of 6% solution of potassium dichromate in de-mineralized water, 2-3% ammonia and 2-3% of non-additive mineral oil. In another preferred embodiment the said composition consists in about 95% of 1% solution of potassium permanganate in de-mineralized water, 0.5-1% of ammonia and 4% of non-additive mineral oil, all the proportions being reported as the weight. The first embodiment is especially designed for liquid combustibles and the second preferred embodiment, much more active, for solid combustibles. The additivation process consists in diluting any of these compositions in distilled water, in quantity of 1/1 to 1/6 parts by weight, transforming it into an aerosol by using a fraction of a combustion air blast introduced into the furnace together with the rest of the combustion air, in proportion of 0.01-0.05% active solution to the total quantity of the air necessary for burning the liquid and gaseous combustible or 0.1-0.15% for solid combustible, all proportions being by weight. The dilution with distilled water of any composition is dependent on the temperature of the combustion air fraction blast namely the dilution is proportionally decreasing with the decreasing of the temperature.

The additive unit for treating the air necessary for the combination of combustibles, using the composition with the above mentioned characteristics, was quite simply. It included a single vessel provided with pneumatic stirrer. The vessel contained the chosen additive composition depending on the used combustible and a set of air ducts for transporting the additivated air to the burner. It also includes a compressor, which produces the necessary air for generating the aerosols and a regulating loop with the role of maintaining a constant proportion of active solution in the combustion air, depending on the total air quantity necessary for burning process. These technical solutions present some disadvantages:

the need to inject the additives into the combustibles in the case of certain combustibles and firing systems;

the need to increase the chemical stability of the said compositions, especially when great temperature variations occur in the environment.

OBJECTS OF THE INVENTION

The object of the present invention is to provide a similar alkaline metal combination-based composition (salts) of great stability, but which can be introduced either in the used combustible or in the combustion air, depending on the situation.

Another object of the present invention is to provide a process for treating combustibles of different types with this composition, a process of obtaining the composition, and a device for obtaining the composition.

SUMMARY OF THE INVENTION

The potassium combinations-based composition for the combustible additivation according to the present invention can have two different variants depending on the combustible type. In the case of firing installations using common liquid or gaseous combustibles as well as the firing installations using solid combustibles simultaneously with liquid or gaseous combustibles for enhancing the burning process, the composition contains about 20% of a 6% aqueous solution of potassium dichromate, treated with monochromatic light having about $\lambda 480 \times 10^{-9} - 490 \times 10^{-9}$ meter, 0.02% ammonia; 0.2% nonadditive mineral oil; and about 80% de-mineralized water. In case of firing installations consuming solid combustibles e.g. coal, solid deposits, or liquid combustibles with a high viscosity, higher than that of the fuel oil, as bituminous shale, refinery deposit, the composition to be used is a more active one, including the following constituents: about 10% of 5% aqueous solution of potassium permanganate, treated with monochromatic light having $\lambda$ about $595 \times 10^{-9} - 625 \times 10^{-9}$ meter, 0.05% urea, 0.3% non-additive mineral oil; and about 90% de-mineralized water. Any of these two compositions may be used or introduced in the combustion air or into the combustible, the proportions remaining the same. In case one of the compositions is introduced in the combustion air, its volume ratio comparing with the combustion air will be of about $5 \times 10^{-7} \pm 20\%$. In case the additivation composition is introduced in the combustible, the corresponding quantity of active substance is calculated reported to the nominal combustion air quantity for combustion (firing) process. Taking into account the composition quantity, expressed in grams of active substance, which is to be introduced into the combustion air or directly in the combustible reported to the heat quantity, produced in the plant there are 0.025 gr.±20% for each $10^9$ cal.

The process for obtaining any of these two compositions includes the treatment of the active substance, consisting, in the first variant, in potassium dichromate in aqueous solution 6% and, in the second variant, in potassium permanganate in aqueous solution 5%, with a monochromatic light having the wave lengths above mentioned. The active substance is caused to flow continuously and uniformly, along a horizontal circulation trough in a thin layer of maximum 3 mm and is allowed to easily drop along the generatrix of a horizontal quartz glass cylinder, which rotate with a constant number of revolutions in the liquid flowing direction on the circulation trough. The monochromatic light generator continuously gives out light, along the cylinder axis, during the whole liquid flow period. The color filter of the monochromatic light is chosen depending on the wavelength necessary for the active substance to be treated.

The device for treating with monochromatic light is made of a circulation trough, placed with the tap hole above and parallel to a quartz glass cylinder, which is being driven in a rotating movement around its own axis, so the treated liquid is flowing along the upper generatrix of the glass cylinder. A monochromatic light generator is placed at one cylinder end and a mirror is placed perpendicularly to the cylinder axis, at the other end. The liquid flowing along the rotating cylinder is collected in a collector vessel.

The advantages provided by the present invention are believed to be self-evident in view of the long-accepted disadvantages of previously proposed compositions and processes for improving the combustible combustion, and are the following: the introduction of compositions is maintained constant, whatever the combustible quality variation or the firing installation thermal load variation may be;

if applied in the correct manner, each composition allows full achievement of the goals of the additivating process, namely the removal of deposits on the heat exchange metallic surfaces, inhibition of the corrosion, decreasing of the corrosive and harmful emission, decreasing of the negative impact over the environment;

the metals whose salts discharged to the environment are harmful, e.g. Cr, Ni, Mn, are collected inside of the firing installation on the metallic sides of the firing chamber, as protective layers against corrosion.

BRIEF DESCRIPTION OF THE DRAWING

Two preferred embodiments of the invention depending on the used combustible characteristic will now be described by way of example with reference to the accompanying drawing in which.

SPECIFIC DESCRIPTION

Figure 1:
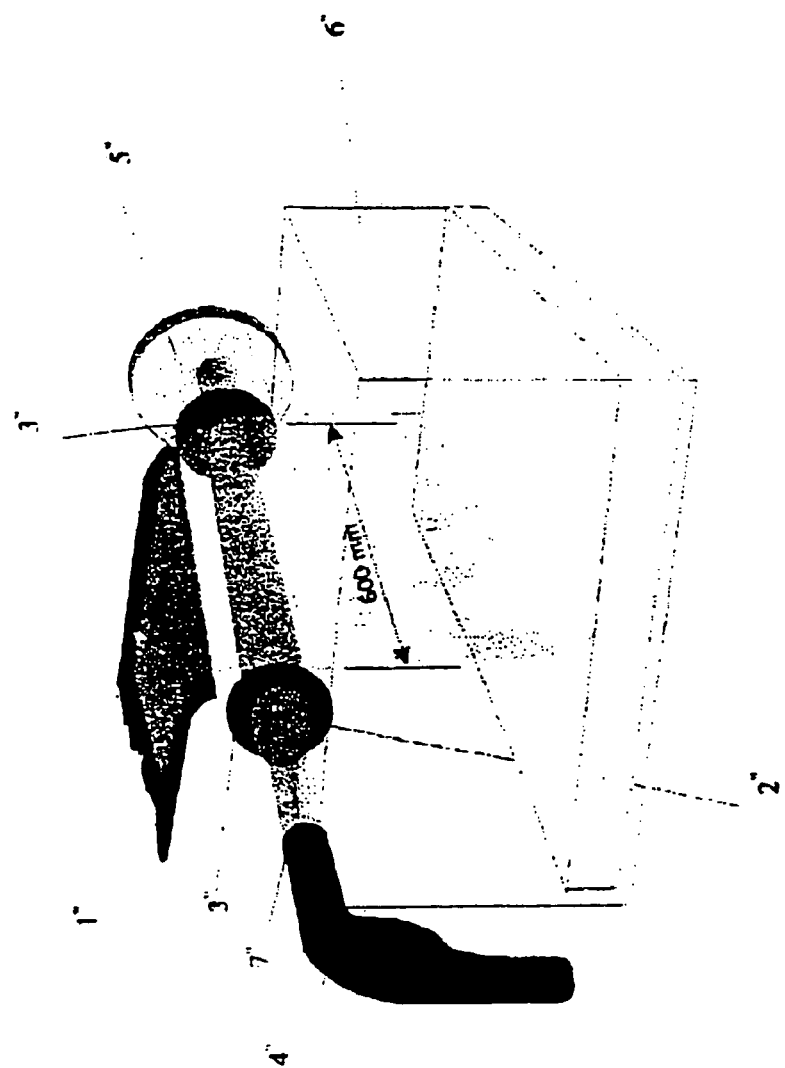
FIG. 1 is a diagrammatic perspective view of a device for the monochromatic light treatment of the active substance.

In the case of firing installations using common liquid or gaseous combustibles as well as the firing installations using solid combustibles simultaneously with liquid or gaseous combustibles for enhancing the burning process, the composition contains:

about 20% of a 6% aqueous solution of potassium dichromate, treated with monochromatic light having $\lambda$ about $480 \times 10^{-9} - 490 \times 10^{-9}$ meter.

0.02% ammonia;

0.2% non-additivated mineral oil;

about 80% demineralized water.

The composition used for firing installations using solid combustible, e.g. coals, solid deposits, or liquid combustibles with high viscosity (higher than that of the fuel oil) like bituminous shale, refinery deposit, consists in:

potassium permanganate in aqueous solution 5%, treated with monochromatic light with a wave length $\lambda$ about $595 \times 10^{-9} - 625 \times 10^{-9}$ meter, in total proportion of about 10%;

urea 0.05%;

non-additivated mineral oil 0.3%;

de-mineralized water about 90%;

All these proportions are by weight.

Any of the two compositions may be used or introduced in the combustion air or in the combustible, maintaining the same proportions. In case one of the compositions is introduced in the combustion air, its volume ratio related to the combustion air will be of $5 \times 10^{-7} \pm 20\%$. In case the additivation composition is introduced in the combustible, the active substance quantity will be calculated taking into account the nominal quantity of combustion air needed for the combustion process.

Considering the composition of the active substance—expressed in grams—which has to be introduced in the combustion air or directly in the combustible compared with the heat quantity produced in the installation there are 0.025 gr±20% for each $10^{-9}$ cal. produced.

Having in view that ammonia can be replaced by urea, the combustion air can be additivated with ammonia and the combustible with urea. The process of treating with monochromatic light will now be disclosed. Introducing one of these compositions either in the combustion air as activator vapors, or in the combustible for the combustion process, it will react with the corrosion products formed during the combustible combustion process and it will neutralize them. Analyzing the effects produced it looks like a new chemical compound is appearing in these reactions, one can treat it (as chemical formula) as $H_2SO_5$ which reacts only with the molecules of unburned substances molecules of the combustion products. The said reaction begins at temperatures of about 750° C. and ends after the temperature decreases below about 100° C. This compound should have a short period of existence having a free oxygen ion attracted to it. The oxygen ion will start the oxidation of surrounding particles, and as at the moment of the $H_2SO5$, appearance the substances which are more easily burned may have already been oxidized, it will go towards the combustion of any unburned substances, including towards those from the deposit on the heat exchange surfaces. So, essentially, it will be a mutual neutralization of two major disadvantages of combustion, especially of lower quality fuels, possible as a result of the contribution controlled by the additive.

For this reason the present invention uses the two potassium salts—the dichromate and the permanganate, which react with sulfuric acid. The acid is neutralized and free oxygen ions are released. So, for a short time, this supposed $H_2SO_5$ with affinity only for the unburned substances and not for metal (Iron) is present, the sulfuric acid has an affinity of 100% for the two salts and not for the metal.

The analysis made during the experiments have shown that, after more than 4000 hours of functioning with combustibles so additivated, the metallic heat exchange surfaces are covered with a protective layer, e.g. made of chromium or manganese. Chromium and manganese are to be found, together with nickel and zinc, in different concentrations, in some of the used combustibles and these elements deposit kept on the metallic heat exchange surfaces. The protector layer so formed on the heat exchange surfaces won't influence at all the thermal transfer output, its width having molecular dimensions. In fact, a protective metal coating of the metallic surfaces takes place.

In order to achieve the above mentioned effects, the process according to the present invention consists in that a controlled quantity of one of the two compositions shall be introduced into the combustion air or in the combustible, having a special affinity for the sulfuric acid will react with this sulfuric acid. permanently formed during the combustion of the sulphur-containing combustible releasing the free oxygen ions which have the capacity of breaking the stable bonds of the unburned substances. The formation of adherent deposits on the thermal exchange surfaces is no longer possible.

The quantity of the composition to be introduced either in the combustion air or directly in the combustible is extremely small. Nevertheless, the effects and the advantages above mentioned are real. It is worth mentioning that both chemical compositions do not react unless the temperature in the combustion chamber reaches a minimum of 750° C.; also, the compositions are so made that once activated at temperatures over 750° C., they will continue their activity until they leave the firing installations (through the chimney). Both compositions have the capacity of using some existing metals in the combustibles: Ni, Cr, Mn—metals whose salts are harmful in case they are released in the environment—for depositing them on the metallic heat exchange surfaces walls as protective layers, in those areas where the working temperatures are lower and the corrosion exposure is higher.

The additivation compositions contain chromium. The chromium quantity contained by the composition reported to the chromium quantity contained by the combustible is extremely small, as well as compared with the rest of the metals contained by the combustible. For instance, in case of a boiler with a capacity of 120 t superheated steam per hour, the maximum total quantity of necessary active substance is of 3-5 g/24 hours. Diverse types of additivation installations may be used for additivation of the combustion air. Still, we recommend using the installation according to the Romanian patent RO 113489, considering it's a simple and effective one and allows a more precise additivation: the regulating loop is no longer necessary as-the solution volume is proportionally varying with the variation of the thermal load, as the experiments have showed.

Figure 2:
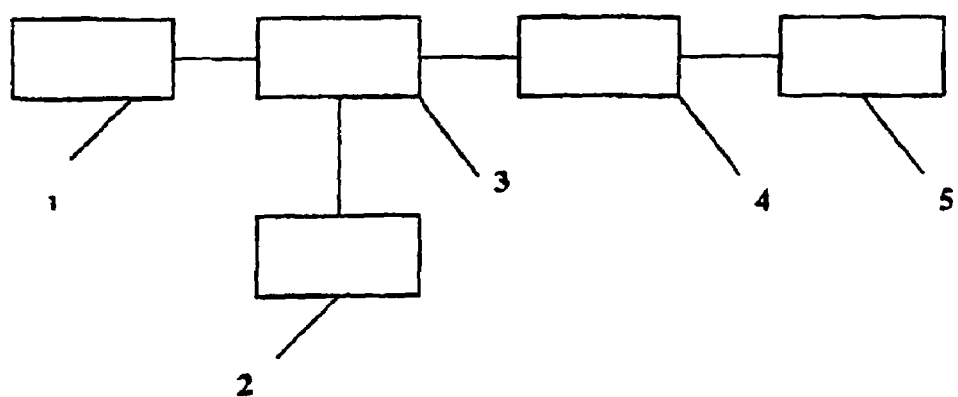
FIG. 2 is a block diagram for the liquid combustible treatment with the additivation composition.
Figure 3:
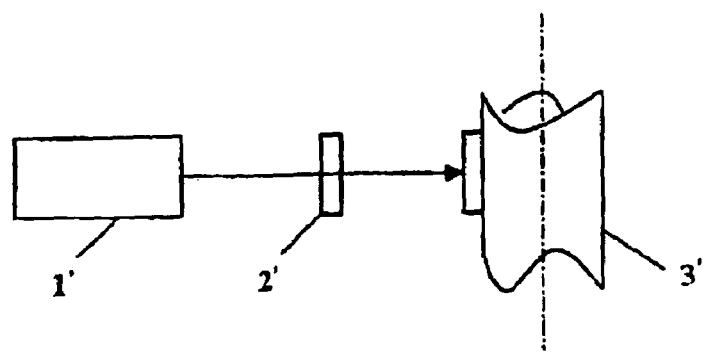
FIG. 3 is a block diagram for the gaseous combustible treatment with the additivation composition.

As shown in FIG. 2 representing the block diagram, a simple installation is used for additivating a liquid combustible in its mass. The composition from a tank 1 is mixed in the due proportion with the combustible—fuel oil—from a tank 2 through a batch stirrer 3. The mixture so formed is then taken over by a pump 4 and introduced in a day-tank 5. The additivation of the combustion gas is also easily made as shown in FIG. 3. The aerosols generated by an aerosol generator 1' pass through a pressure regulator 2' and then are injected in a gas line 3' and from here they enter, through the burner, into the focus. The process for obtaining any of the two compositions includes the treatment of the active substance, consisting in a first variant in potassium dichromate in 6% aqueous solution and in a second variant in potassium permanganate in 5% aqueous solution, with monochromatic light with the wavelengths above mentioned. The active substance is flowing continuously and uniformly along a horizontal circulation trough in a thin layer of maximum thickness of 3 mm and is slowly allowed to fall along the generating line of a horizontal quartz glass cylinder. Simultaneously the cylinder is rotating with a constant number of revolutions arc and its own axis in the flowing sense of the liquid on the circulation trough. The monochromatic light generator continuously gives out the light along the cylinder axis during the entire liquid flow period. The color of the monochromatic light generator color filter is chosen depending on the wavelength of the necessary monochromatic light for the active substance to be treated.

In a preferred embodiment for treating the composition active substance the monochromatic light generator used has a power of 20 w, and a light density of 40 mW/cm$^2$. The best results have been obtained when a glass cylinder of 600 mm length and 100 mm diameter rotating with a number of revolutions of 10-12 rot/mm were used. In the circulation trough the liquid has to flow continuously with a uniform speed and a discharge of about 121/min.

The device for the monochromatic light treatment, as shown in FIG. 1, consists of a circulation trough 1" placed with the tap hole above and parallel to a quartz glass cylinder 2" so that the treated liquid flows onto the glass cylinder 2" at its upper generating line. The glass cylinder has to be driven, by some known means, in a continuous rotating movement with a constant number of revolutions, around its own axis. The rotating sense is the same as the liquid flow sense in the circulation trough. Due to the fact that the instantaneous liquid discharge flowing on the circulation trough has to be relatively constant it is advisable to assure the discharge by a dosage device. The cylinder is provided at the both ends with two ring-shaped limiters 3" which do not allow the spread of the liquid falling on the cylinder. A mono-chromatic light generator 4" is located at one end of the cylinder in order to emit light along cylinder rotation axis. A plane mirror 5" located at the other end of the glass cylinder, perpendicularly to its axis, continuously reflects its tight. The treated liquid flowing from the cylinder falls into a collector vessel 6". Due to the fact each of the two active substances is treated only with monochromatic light of a certain wavelength, the generator is provided with a color filter 7" which can be replaced whenever necessary.

The composition and the process according to the present invention were applied in a relative high number of firing installations of different dimensions, using all types of combustibles. Some of the results for these two installations will be presented below.

1. VRANCART—ADJUD—ROMANIA company has launched on 3 Mar. 1998 a new boiler made by the U.S. company CLEAVER BROOKS, with the following parameters:

Q–25 t steam/hour
P=18 bar
T=250° C.

The boiler continuously worked with fuel oil, until 12 Jun. 1998 without being provided with any additivation combustion installations. Deposits on the boiler's walls as well as on the pipes to the chimney have been found when the boiler functioning was interrupted. From that day the boiler, has been provided with an air additivation installation according to the present invention. Subsequently it was stopped at the end of October 1999. The deposit previously found on the boiler walls and pipes has disappeared. Moreover, despite the fact that the boiler was new and of modern conception, a reduction of the fuel oil consumption with almost 5% has been noticed.

2. S.C. SOFERT SA company in Bacâu has applied the composition and the process according to the present invention to a steam boiler with the following

| major technical data: | |
|---|---|
| nominal discharge | 120 t/h |
| nominal power | 100 kf/cm' |
| overheated steam temperature | 540° C. |
| field water temperature | 215° C. |
| combustible consumption: | |
| fuel oil | 7900 kg/h |
| natural gases | 9230 Nm$^3$/h |

The boiler was turned on with fuel oil, functioned exclusively with fuel oil for about 500 hours and there already were certain signs of being plugged. The boiler load was already limited and the steam parameters necessary for driving a turbine were impossible to be provided in working safety conditions.

The coupling of the additivation installation was made without stopping the boiler functioning, because of the steam supply for the consumers need. First stop took place at 29 Dec. 1999 after a continuous work regime of ~2000 hours. A mixed commission has examined the results making video records, pictures and chemical analysis of the deposit found in the boiler. We will now present some of these results. In the firing chamber on the back screen:

the screen pipes are partially clean; the existing deposits are few, non-adherent and friable; after their removal, the pipes remain clean, close to the metallic luster. When deposit is detached, on both the screen pipes and steel strips no adherent layers are present.

The old deposit on the economizer serpentine have been totally removed. Only a white powder with a particle size of maximum 0.2 mm, easy to be removed, has been found on the serpents iñe.

The main effects ascertained were:
an almost total removal of the deposit, including the old ones and the corrosion ones;
the total disappearance of the sulphur salts;
the total disappearance of the sulfuric acid and of sulfuric anhydride; -true lack of unburned substances.

All the above-mentioned allegations can be asserted on the basis of the references obtained as a result of high load resistance applications, from 1 to 5 years, at diverse beneficiaries.

The invention claimed is:

1. A composition for improving the combustion used in firing installations using liquid or gaseous combustibles as well as those using solid combustibles simultaneously with liquid and gaseous combustibles, wherein the composition comprises about 20% of 6% aqueous solution of potassium dichromate, treated with monochromatic light with wave length λ about 480–490 $10^{-9}$ m; ammonia 0.02%; nonadditive mineral oil 0.2%; and de-mineralized water about 80%.

2. Process of using the composition according to claim 1 wherein the composition is introduced into a burner either in the combustion air or, in the combustible mass, in a ratio of 0.025 gr±20% for each $10^9$ cal. produced.

3. A method of improving combustion comprising the steps of:
(a) supplying at least one combustible selected from the group which consists of gaseous, solid and liquid fuels to a burner;
(b) supplying combustion air to said burner whereby said combustible is at least partly dispersed in said air and burns in said air; and
(c) adding to at least one of said combustion air or said combustible a combustion-improving quantity of an additive which comprises:
about 20% by weight of a 6% aqueous solution of potassium dichromate treated with monochromatic light of a wavelength of about $480 \times 10^{-9}$ meter to about $490 \times 10^{-9}$ meter,
0.02% by weight ammonia,
0.2% by weight nonadditive mineral oil, and
about 80% by weight demineralized water.

4. The method defined in claim 3 wherein said additive is added in an amount of 0.025 gram±20% for each $10^9$ calories produced.

5. The method defined in claim 4 wherein said additive is added in a volume ratio to the combustion air of about $5 \times 10^{-7} \pm 20\%$.

* * * * *